United States Patent
Liu et al.

(10) Patent No.: US 8,290,463 B2
(45) Date of Patent: Oct. 16, 2012

(54) UNIVERSAL DEMODULATION AND MODULATION FOR DATA COMMUNICATION IN WIRELESS POWER TRANSFER

(75) Inventors: Xun Liu, New Territories (HK); Wai Pong Choi, Kowloon (HK)

(73) Assignee: ConvenientPower HK Ltd., Shatin, N.T. (HK)

( * ) Notice: Subject to any disclaimer, the term of this patent is extended or adjusted under 35 U.S.C. 154(b) by 611 days.

(21) Appl. No.: 12/558,955

(22) Filed: Sep. 14, 2009

(65) Prior Publication Data

US 2011/0065398 A1 Mar. 17, 2011

(51) Int. Cl.
*H04B 1/18* (2006.01)

(52) U.S. Cl. ...... 455/293; 455/292; 455/309; 340/572.4

(58) Field of Classification Search .................. 455/292, 455/309, 41.1, 41.2, 295, 312, 337; 340/572.4, 340/572.7
See application file for complete search history.

(56) References Cited

U.S. PATENT DOCUMENTS

| | | | | |
|---|---|---|---|---|
| 3,646,434 A * | 2/1972 | Norwich | | 324/669 |
| 4,201,946 A * | 5/1980 | McFadyen | | 329/317 |
| 5,706,082 A * | 1/1998 | Colgan et al. | | 356/311 |
| 6,429,646 B1 * | 8/2002 | Han | | 324/202 |
| 6,803,744 B1 | 10/2004 | Sabo | | |
| 6,970,089 B2 * | 11/2005 | Carrender | | 340/572.4 |
| 7,030,704 B2 * | 4/2006 | White | | 331/3 |
| 7,132,918 B2 | 11/2006 | Baarman et al. | | |
| 7,164,255 B2 | 1/2007 | Hui | | |
| 7,212,414 B2 | 5/2007 | Baarman | | |
| 7,239,110 B2 | 7/2007 | Cheng et al. | | |
| 7,262,700 B2 | 8/2007 | Hsu | | |
| 7,532,908 B2 * | 5/2009 | Rofougaran et al. | | 455/552.1 |
| 8,019,379 B2 * | 9/2011 | Rofougaran et al. | | 455/552.1 |
| 2005/0088285 A1 * | 4/2005 | Jei | | 340/10.51 |
| 2007/0182367 A1 | 8/2007 | Partovi | | |
| 2008/0049372 A1 * | 2/2008 | Loke | | 361/143 |
| 2008/0067874 A1 | 3/2008 | Tseng | | |
| 2008/0266060 A1 * | 10/2008 | Takei | | 340/10.4 |
| 2009/0108805 A1 | 4/2009 | Liu et al. | | |
| 2009/0289776 A1 * | 11/2009 | Moore et al. | | 340/10.41 |
| 2010/0134257 A1 * | 6/2010 | Puleston et al. | | 340/10.4 |
| 2012/0044017 A1 * | 2/2012 | Lachartre | | 329/336 |

FOREIGN PATENT DOCUMENTS

| | | |
|---|---|---|
| WO | WO-96/18969 A1 | 6/1996 |
| WO | WO-2007/015599 A1 | 2/2007 |
| WO | WO-2008/114268 A2 | 9/2008 |
| WO | WO-2009/040807 A2 | 4/2009 |

\* cited by examiner

*Primary Examiner* — Minh D Dao

(74) *Attorney, Agent, or Firm* — Fenwick & West LLP

(57) ABSTRACT

The present invention provides a universal demodulation circuit, a load modulation circuit and associated method, and an associated power transfer system, all suitable for use in wireless power transfer. A power receiver with signal strength detection is also provided. Modulation of the impedance of the demodulation circuit is determinable by detecting the amplitudes of a first and a second electrical parameter, thereby demodulating data communicated by modulation of the impedance of the demodulation circuit. The modulation circuit has a communication modulator to modulate the impedance of the modulation circuit, to a predetermined minimum modulation depth, thereby to communicate data.

17 Claims, 12 Drawing Sheets

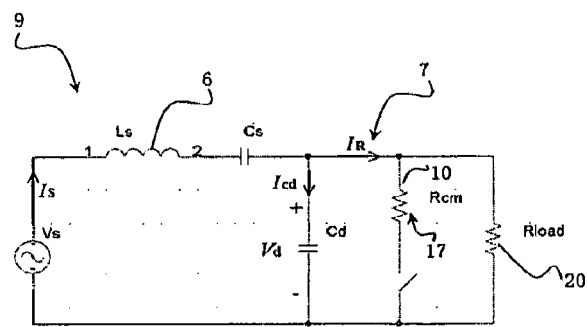
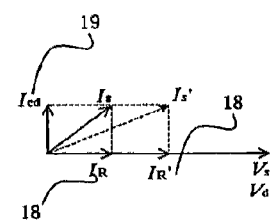
FIG. 18
FIG. 19
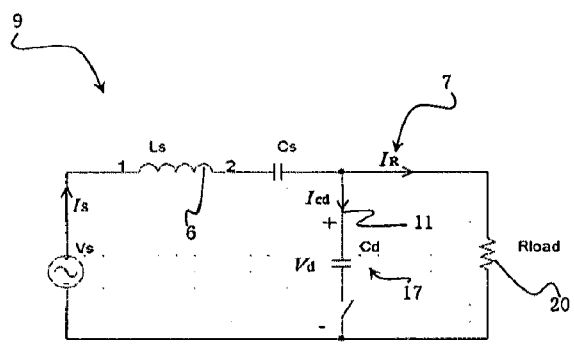
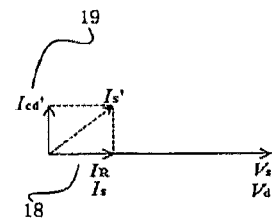
FIG. 20
FIG. 21

UNIVERSAL DEMODULATION AND MODULATION FOR DATA COMMUNICATION IN WIRELESS POWER TRANSFER

FIELD OF THE INVENTION

The present invention relates to demodulation and modulation circuits, particularly those used in data communication in wireless power transfer.

BACKGROUND OF THE INVENTION

Wireless inductive power transfer related technology employs near-field magnetic inductive coupling between an energy transmitter coil and an energy receiver coil to transfer energy through a high frequency (typically hundreds of kilo-Hertz or even mega-Hertz) magnetic field. The energy transmitter coil typically forms part of a transmitter and the energy receiver coil typically forms part of a receiver.

One important aspect of wireless power transfer is the accompanying data (information) communication between transmitter and receiver. Such information communication serves at least, but not limited to, one of the following functions:

a) localization of receivers on the surface of the transmitter (i.e. load and load-position detection);
b) compatibility checking of the receiver through an identification process (i.e. load identification);
c) configuring the transmitter or receiver based on the transferred information;
d) establishing a power transfer contract (a "power transfer contract" represents the parameters that characterize the power transfer);
e) exchanging power transfer status or error messages; and
f) monitoring of battery conditions.

The information communication can be bi-directional (from transmitter to receiver and from receiver to transmitter) or in a single direction. It can be implemented with existing communication methods, such as those used in RFID, NFC, Bluetooth, Wi-Fi, or others (Partovi, US 2007/0182367).

However, one disadvantage of such methods is that some communication IC and circuits need to be added to the transmitter and/or receiver for communication purposes, which introduces extra components, complexity and cost. In some instances, extra coils for data transfer are also required.

In most cases, data transfer from the receiver to the transmitter is more important and sometimes mandatory. One relatively simple method to achieve this purpose is by using a method called load modulation, in which some additional load impedance is switched on and off during communication so that the total load impedance is changed. For example, a receiver can include a resistor or a capacitor which is switched on and off for communication purposes. In particular, the changed load impedance influences some electrical characteristics of the transmitter so that the data can be detected and re-constructed.

Indeed, such load modulation methods have been widely used in RFID systems. Normally, however, the amplitude change of one electric parameter (like the voltage across the transmitter coil or the current through the coil) of the transmitter is detected and used for demodulation. This is called "amplitude modulation and demodulation". It has been analyzed and shown that such amplitude demodulation is always valid because the load modulation is very "prominent" in RFID systems due to very little power being transferred.

However, in wireless power transfer, data transfer is accompanying energy transfer. Load modulation must be analyzed with the consideration of different loading conditions. In fact, there is a very wide range of loads having many different power requirements. This is totally different to RFID systems. Furthermore, when differences in coupling due to the different possible relative positions of the transmitter and receiver and the different distances between the transmitter and receiver are taken into account, load modulation becomes even more complex.

Moreover, the receiver may use many different methods to achieve load modulation. Besides the examples described above which use a resistor or a capacitor, some parameter in the receiver passive network (such a network can be a resonant tank, a filter or other functional network formed from passive components) or even the impedance of the receiver coil itself can be changed for the purpose of data transfer.

Thus, in developing a universal transmitter to work with different receivers using different load modulation methods, simple amplitude demodulation at the transmitter is not appropriate since it is not always valid. Therefore, there is a need for a universal demodulation method in order to develop a universal transmitter for standardized wireless power transfer.

It is an object of the present invention to overcome or ameliorate at least one of the disadvantages of the prior art, or to provide a useful alternative.

SUMMARY OF THE INVENTION

The present invention provides in one aspect a demodulation circuit for a wireless power transfer device, the demodulation circuit having a first, a second, and a third electrical parameter wherein one of the electrical parameters is equal to the vector sum of the other two electrical parameters, and modulation of the impedance of the demodulation circuit results in corresponding modulation of one or both of the amplitude and phase of the first electrical parameter, the corresponding modulation being determinable by detecting the amplitude of the first electrical parameter and the amplitude of the second electrical parameter, thereby demodulating data communicated by modulation of the impedance of the demodulation circuit.

Preferably, the demodulation circuit is passive.

Preferably, the demodulation circuit includes a first power transfer coil for inductive coupling with a second power transfer coil in a modulation circuit, such that modulation of the impedance of the modulation circuit results in corresponding modulation of the impedance of the demodulation circuit, thereby allowing data to be communicated wirelessly from the modulation circuit to the demodulation circuit.

In one embodiment, the demodulation circuit includes an inductor connected in series with the first power transfer coil and a capacitor connected after the inductor in parallel with the first power transfer coil, such that the vector sum of the voltage across the inductor and the voltage across the first power transfer coil is equal to the voltage across the demodulation circuit, and wherein the first electrical parameter is the voltage across the first power transfer coil, the second electrical parameter is the voltage across the inductor, and the third electrical parameter is the voltage across the demodulation circuit. In a variation, the amplitude of the voltage across the inductor is detected by detecting the amplitude of the current flowing through the inductor.

In another embodiment, the demodulation circuit includes a capacitor connected in series with the first power transfer coil, such that the vector sum of the voltage across the capacitor and the voltage across the first power transfer coil is equal to the voltage across the demodulation circuit, and wherein the first electrical parameter is the voltage across the first power transfer coil, the second electrical parameter is the voltage across the capacitor, and the third electrical parameter is the voltage across the demodulation circuit. In a variation, the amplitude of the voltage across the capacitor is detected by detecting the amplitude of the current flowing through the capacitor.

In a further embodiment, the demodulation circuit includes a capacitor connected in parallel with the first power transfer coil, such that the vector sum of the current flowing through the capacitor and the current flowing through the first power transfer coil is equal to the current entering the demodulation circuit, and wherein the first electrical parameter is the current flowing through the first power transfer coil, the second electrical parameter is the current entering the demodulation circuit, and the third electrical parameter is the current flowing through the capacitor.

Preferably, the demodulation circuit includes a controller for detecting the amplitudes of the first and the second electrical parameters.

In one embodiment, the controller is adapted to directly detect both the amplitudes of the first and the second electrical parameters.

In another embodiment, the demodulation circuit includes a signal buffer for detecting one of the amplitudes of the first and the second electrical parameters and sending corresponding data to the controller, wherein the controller is adapted to directly detect the other of the amplitudes of the first and the second electrical parameters. Preferably, the signal buffer is a shift register or a second controller. More preferably, the second controller is of lower functionality or complexity when compared to the first controller.

In a further embodiment, the demodulation circuit includes a logic network for detecting both the amplitudes of the first and the second electrical parameters and performing a logical "or" function on the amplitudes, wherein the controller is adapted to receive the results of the logical "or" function.

Preferably, the controller is a micro-controller-unit.

In another embodiment, the demodulation circuit performs one or more of the following functions: a resonant tank, impedance matching, and filtering.

Preferably, the demodulation circuit forms part of a wireless power transmitter, wherein the first power transfer coil transmits power wirelessly to the second power transfer coil.

In another aspect, the present invention provides a modulation circuit for a wireless power transfer device, the modulation circuit having a communication modulator to modulate the impedance of the modulation circuit thereby to communicate data, the communication modulator selected to modulate the impedance to a predetermined minimum modulation depth.

Preferably, the impedance has an active part and a reactive part, the vector sum of the active and reactive parts being equal to the impedance, and wherein the communication modulator modulates one or both of the active and reactive parts to modulate one or both of the amplitude and phase of the impedance.

Preferably, the modulation circuit includes a second power transfer coil for inductive coupling with a first power transfer coil in a demodulation circuit, such that modulation of the impedance of the modulation circuit results in corresponding modulation of the impedance of the demodulation circuit, thereby allowing data to be communicated wirelessly from the modulation circuit to the demodulation circuit.

In one embodiment, the communication modulator includes a communication resistor connected in parallel with a load in the modulation circuit, the communication resistor adapted to be switched on and off to modulate the impedance of the modulation circuit.

In one variation, the modulation circuit includes a first capacitor connected in series after a second capacitor, the communication resistor connected between the first and second capacitors and in parallel with the first capacitor. Preferably, the modulation circuit includes a second power transfer coil connected in series before the second capacitor.

In another variation, the modulation circuit includes a capacitor connected in series before the communication resistor and the load. Preferably, the modulation circuit includes a second power transfer coil connected in series before the capacitor.

In a further embodiment, the communication modulator includes a communication capacitor connected in parallel with a load in the modulation circuit, the communication capacitor adapted to be switched on and off to modulate the impedance of the modulation circuit. Preferably, the modulation circuit includes a second capacitor connected in series before the communication capacitor and the load. Preferably, the modulation circuit includes a second power transfer coil connected in series before the second capacitor.

In one embodiment, the active and reactive parts are in quadrature and the voltage across the modulation circuit can be assumed constant, such that the predetermined minimum modulation depth can be expressed as $$\frac{\sqrt{(I'_{sa} - I_{sa})^2 + (I'_{sr} - I_{sr})^2}}{\sqrt{I_{sa}^2 + I_{sr}^2}} \geq req$$

wherein:
req is the predetermined minimum modulation depth;
$I_{sa}$ is the active part of the total current flowing through the modulation circuit before modulation;
$I_{sr}$ is the reactive part of the total current flowing through the modulation circuit before modulation;
$I_{sa}'$ is the active part of the total current flowing through the modulation circuit after modulation; and
$I_{sr}'$ is the reactive part of the total current flowing through the modulation circuit after modulation;
whereby the capacity of the communication modulator required to satisfy the predetermined minimum modulation depth can be calculated, and the communication modulator is selected based on the calculated capacity.

In another embodiment, the active and reactive parts are in quadrature and the total current entering the modulation circuit can be assumed constant, such that the predetermined minimum modulation depth can be expressed as $$\frac{\sqrt{(V'_{sa} - V_{sa})^2 + (V'_{sr} - V_{sr})^2}}{\sqrt{V_{sa}^2 + V_{sr}^2}} \geq req$$

wherein:
req is the predetermined minimum modulation depth;
$V_{sa}$ is the active part of the voltage across the modulation circuit before modulation;
$V_{sr}$ is the reactive part of the voltage across the modulation circuit before modulation;

$V_{sa}'$ is the active part of the voltage across the modulation circuit after modulation; and $V_{sr}'$ is the reactive part of the voltage across the modulation circuit after modulation;

whereby the capacity of the communication modulator required to satisfy the predetermined minimum modulation depth can be calculated, and the communication modulator is selected based on the calculated capacity.

Preferably, the modulation circuit is passive.

Preferably, the modulation circuit forms part of a wireless power receiver, wherein the second power transfer coil can receive power wirelessly from the first power transfer coil.

In a further aspect, the present invention provides a power receiver for receiving and transferring power to a load, the power receiver including a rectification circuit connected before the load, and further including a voltage detector for detecting the voltage before the rectification circuit.

Preferably, the power receiver includes an auxiliary rectifier connected before the voltage detector.

Preferably, the power receiver includes the modulation circuit described above, wherein the data includes the detected voltage.

Preferably, the power receiver includes a second power transfer coil for inductive coupling with a first power transfer coil in a power transmitter, thereby allowing wireless power transmission from the power transmitter to the power receiver, and wherein the detected voltage indicates power signal strength between the power transmitter and the power receiver.

In yet another aspect, the present invention provides a power transfer system including the demodulation circuit described above and the modulation circuit described above.

Preferably, the power transfer system includes a wireless power transmitter and a wireless power receiver, the wireless power transmitter adapted to transmit power wirelessly to the wireless power receiver. Preferably, the wireless power receiver includes the modulation circuit and the wireless power transmitter includes the demodulation circuit, thereby allowing data to be communicated wirelessly from the wireless power receiver to the wireless power transmitter. Preferably, the wireless power receiver is the power receiver described above.

In a further aspect, the present invention provides a method of modulating the impedance of a modulation circuit to communicate data, the method including:

determining the capacity of a communication modulator such that the communication modulator can modulate the impedance to a predetermined minimum modulation depth;

providing the modulation circuit with the communication modulator, such that the impedance of the modulation circuit can be modulated with the communication modulator, thereby to communicate data.

Preferably, the impedance has an active part and a reactive part, the vector sum of the active and reactive parts being equal to the impedance, and wherein determining the capacity of the communication modulator includes determining the vector sum of the active and reactive parts such that the impedance can be modulated to a predetermined minimum modulation depth by modulating one or both of the amplitude and phase of the impedance with the communication modulator.

Preferably, the method includes providing the modulation circuit with a second power transfer coil for inductive coupling with a first power transfer coil in a demodulation circuit, such that modulating the impedance of the modulation circuit results in corresponding modulation of the impedance of the demodulation circuit, thereby allowing data to be communicated wirelessly from the modulation circuit to the demodulation circuit.

In one embodiment, the method includes providing the communication modulator with a communication resistor connected in parallel with a load in the modulation circuit, the communication resistor capable of being switched on and off to modulate the impedance of the modulation circuit.

In one variation, the method includes providing the modulation circuit with a first capacitor connected in series after a second capacitor, the communication resistor connected between the first and second capacitors and in parallel with the first capacitor. Preferably, the method includes providing the modulation circuit with a second power transfer coil connected in series before the second capacitor.

In another variation, the method includes providing the modulation circuit with a capacitor connected in series before the communication resistor and the load. Preferably, the method includes providing the modulation circuit with a second power transfer coil connected in series before the capacitor.

In a further embodiment, the method includes providing the communication modulator with a communication capacitor connected in parallel with a load in the modulation circuit, the communication capacitor capable of being switched on and off to modulate the impedance of the modulation circuit. Preferably, the method includes providing the modulation circuit with a second capacitor connected in series before the communication capacitor and the load. Preferably, the method includes providing the modulation circuit with a second power transfer coil connected in series before the second capacitor.

In one embodiment, the active and reactive parts are in quadrature and the voltage across the modulation circuit can be assumed constant, and the method includes calculating the capacity of the communication modulator required to satisfy the predetermined minimum modulation depth by using the following expression:

$$\frac{\sqrt{(I'_{sa} - I_{sa})^2 + (I'_{sr} - I_{sr})^2}}{\sqrt{I_{sa}^2 + I_{sr}^2}} \geq req$$

wherein:

req is the predetermined minimum modulation depth;

$I_{sa}$ is the active part of the total current flowing through the modulation circuit before modulation;

$I_{sr}$ is the reactive part of the total current flowing through the modulation circuit before modulation;

$I_{sa}'$ is the active part of the total current flowing through the modulation circuit after modulation; and $I_{sr}'$ is the reactive part of the total current flowing through the modulation circuit after modulation.

In another embodiment, the active and reactive parts are in quadrature and the total current entering the modulation circuit can be assumed constant, and the method includes calculating the capacity of the communication modulator required to satisfy the predetermined minimum modulation depth by using the following expression:

$$\frac{\sqrt{(V'_{sa} - V_{sa})^2 + (V'_{sr} - V_{sr})^2}}{\sqrt{V_{sa}^2 + V_{sr}^2}} \geq req$$

wherein:

req is the predetermined minimum modulation depth;

$V_{sa}$ is the active part of the voltage across the modulation circuit before modulation;

$V_{sr}$ is the reactive part of the voltage across the modulation circuit before modulation;

$V_{sa}'$ is the active part of the voltage across the modulation circuit after modulation; and $V_{sr}'$ is the reactive part of the voltage across the modulation circuit after modulation.

Preferably, the modulation circuit is passive.

Preferably, the method includes connecting the modulation circuit into a wireless power receiver, wherein power can be wirelessly transferred from the first power transfer coil to the second power transfer coil.

BRIEF DESCRIPTION OF THE FIGURES

Preferred embodiments in accordance with the best mode of the present invention will now be described, by way of example only, with reference to the accompanying figures, in which:

FIG. 18 is a circuit diagram of a modulation circuit in accordance with a further embodiment of the present invention, the modulation circuit forming part of a wireless power receiver and using a communication resistor for load modulation;

FIG. 19 is a vector diagram of electrical parameters of the modulation circuit of FIG. 18, showing the results of load modulation, and assuming that $L_s$ and $C_s$ resonate at the carrier frequency;

FIG. 20 is a circuit diagram of a modulation circuit in accordance with another embodiment of the present invention, the modulation circuit forming part of a wireless power receiver and using a communication capacitor for load modulation;

FIG. 21 is a vector diagram of electrical parameters of the modulation circuit of FIG. 20, showing the results of load modulation, and assuming that $L_s$ and $C_s$ resonate at the carrier frequency;

DETAILED DESCRIPTION OF THE BEST MODE OF THE INVENTION

Figure 1:
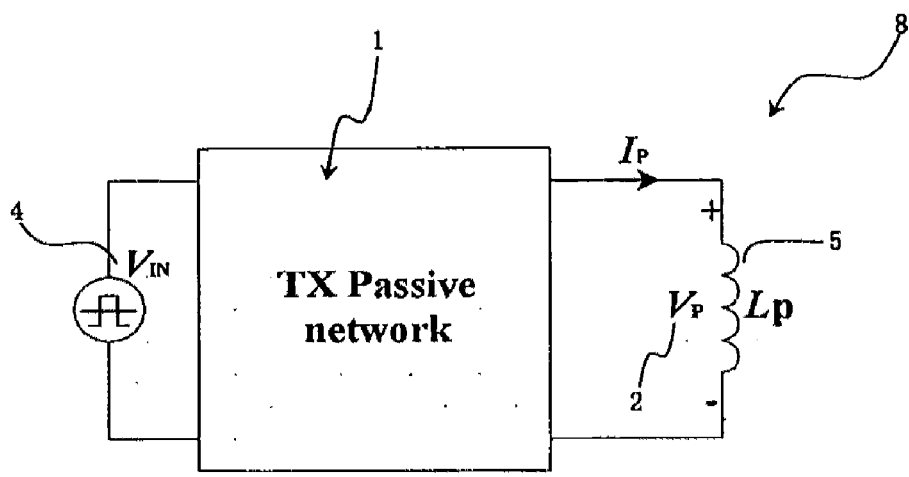
FIG. 1 is a block diagram of a wireless power transmitter in accordance with an embodiment of the present invention.

Referring to the figures, a demodulation circuit 1 for a wireless power transfer device is provided. The demodulation circuit 1 has a first electrical parameter 2, a second electrical parameter 3, and a third electrical parameter 4. One of the electrical parameters is equal to the vector sum of the other two electrical parameters. Furthermore, modulation of the impedance of the demodulation circuit 1 results in corresponding modulation of one or both of the amplitude and phase of the first electrical parameter 2. This corresponding modulation is determinable by detecting the amplitude of the first electrical parameter 2 and the amplitude of the second electrical parameter 3, thereby demodulating data communicated by modulation of the impedance of the demodulation circuit 1.

The demodulation circuit 1 is therefore a universal demodulation circuit, and in general represents a universal demodulation technique, since the demodulation circuit can determine the initially applied modulation of the impedance of the demodulation circuit 1, via determining the corresponding modulation mentioned above, regardless of whether the modulation is of one or both of the amplitude and phase of the impedance.

The demodulation circuit 1 further includes a first power transfer coil 5 for inductive coupling with a second power transfer coil 6 in a modulation circuit 7, such that modulation of the impedance of the modulation circuit results in corresponding modulation of the impedance of the demodulation circuit. This thereby allows data to be communicated wirelessly from the modulation circuit 7 to the demodulation circuit 1.

In the present embodiment, the demodulation circuit 1 forms part of a wireless power transmitter 8, wherein the first power transfer coil 5 transmits power wirelessly to the second power transfer coil 6. The second power transfer coil 6 and the modulation circuit 7 form part of a wireless power receiver 9. Thus, the first power transfer coil 5 can also be referred to as the transmitter coil, and the second power transfer coil 6 can also be referred to as the receiver coil. Embodiments of the modulation circuit 7 and receiver 9 are best shown in FIGS. 16, 17, 18, 20 and 22, which will be discussed in further detail below.

In other embodiments, however, the demodulation circuit 1 can form part of a wireless power receiver, wherein the second power transfer coil 6 transmits power wirelessly to the first power transfer coil 5.

Returning to the present embodiment, as shown in FIG. 1, $V_{IN}$ is the input voltage to the demodulation circuit 1. It is normally the output of a high frequency power inverter. The frequency of the power inverter is called the power signal frequency and is also equal to the carrier frequency. Although $V_{IN}$ can be changed for power flow control, during the short time of communication, it can be looked as a constant value. TX (abbreviation of "transmitter") passive network is a circuit network composed of passive components, which serves at least one of the following functions:
  1) resonant tank;
  2) impedance matching; and
  3) filtering.

Thus, the demodulation circuit 1 can be passive.

$L_p$ represents the transmitter coil. In some embodiments the transmitter coil is actually a plurality of transmitter coils. The receiver coil 6, which can be inductively coupled with the transmitter coil 5, is represented by $L_s$ in the Figures.

Figure 2:
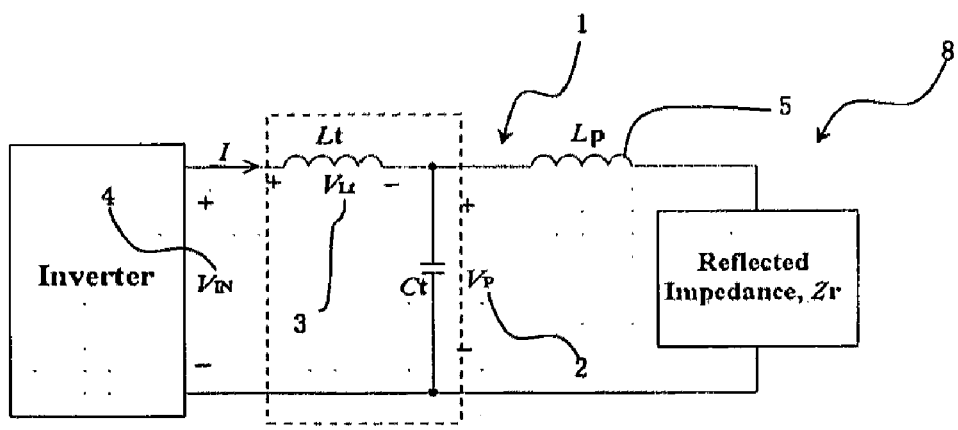
FIG. 2 is a circuit diagram of a demodulation circuit in accordance with an embodiment of the present invention, the demodulation circuit forming part of a wireless power transmitter.

FIG. 2 shows the expanded view of a particular variation of the demodulation circuit 1 as it forms part of the transmitter 8. In this variation, the TX passive network is formed by inductor $L_t$ and capacitor $C_t$. Together with $L_p$, they form a LCL resonant tank. $Z_r$ represents the reflected impedance from the receiver 9 when it is coupled with the transmitter 8. $Z_r$ is influenced by operating frequency, mutual inductance between both coils, impedance of the receiver, including the receiver coil, an RX passive network, a communication modulator and a load.

More particularly, the inductor $L_t$ is connected in series with the first power transfer coil 5 (transmitter coil) and the capacitor $C_t$ is connected after the inductor $L_t$ in parallel with the transmitter coil 5, such that the vector sum of the voltage across the inductor $L_t$ and the voltage across the transmitter coil 5 is equal to the voltage across the demodulation circuit $V_{IN}$.

The following is based on vector analysis. During the data communication process, the impedance of the modulation circuit 7 of the receiver 9 is changed due to the on-off switching of a communication resistor 10 or a communication capacitor 11 in the modulation circuit 7. This is shown in the embodiments depicted in FIGS. 16, 17, 18, 20 and 22, which will be discussed in further detail below. Consequently, the complex vector of the reflected impedance $Z_r$ changes accordingly, be it amplitude change and/or phase change. Furthermore, the vector of the transmitter coil 5 voltage $V_p$ changes with amplitude change and/or phase change.

Figure 3:
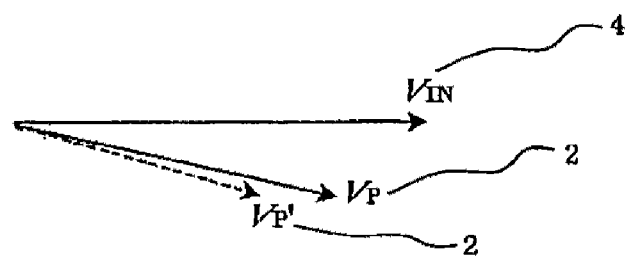
FIG. 3 is a vector diagram of electrical parameters of the demodulation circuit of FIG. 2, showing the results of amplitude modulation.

FIG. 3 shows the vector diagram when $V_p$ has amplitude change due to load impedance modulation. $V_p'$ is the vector of the transmitter coil 5 voltage when load impedance has been changed during communication. In this case, by simply detecting the amplitude (envelop) of $V_p$, the transferred data can be extracted and reconstructed.

Figure 4:
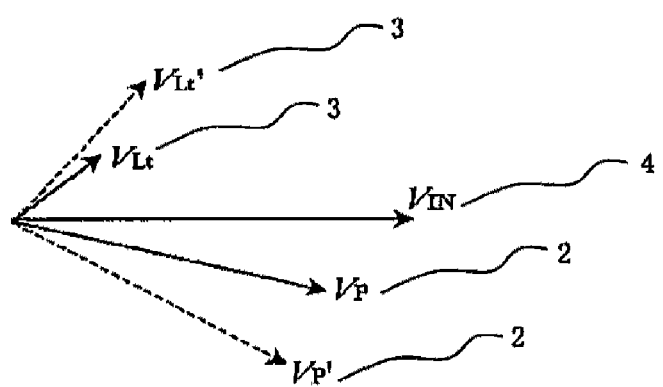
FIG. 4 is a vector diagram of electrical parameters of the demodulation circuit of FIG. 2, showing the results of phase modulation.

However, in some cases, load modulation only causes the vector of $V_p$ to have phase change, as shown in FIG. 4, in which only detecting the amplitude (envelop) of $V_p$ does not allow reconstruction of the transferred data. It has been disclosed that both the amplitude and phase of an electrical parameter (like $V_p$) should be used for demodulation. However, the phase shift detection normally requires complex digital signal processing and cannot be implemented with such simple envelop detectors.

In the present invention, however, an alternative approach is disclosed. As shown in FIG. 4, $V_{IN}$ can be regarded as constant. $V_{IN}$ is equal to the sum of $V_p$ and $V_{Lt}$ in vector sense. When $V_p$ has only phase change, the voltage across $L_t$ must have amplitude variation. So by sensing the amplitude of both $V_p$ and $V_{Lt}$, the transferred data can be detected and demodulated.

Thus, in the present variation of the present embodiment, the first electrical parameter 2 is the voltage $V_p$ across the transmitter coil 5 (the first power transfer coil), the second electrical parameter 3 is the voltage $V_{Lt}$ across the inductor $L_t$, and the third electrical parameter 4 is the voltage $V_{IN}$ across the demodulation circuit 1.

As $V_{Lt}$ has a direct relationship with the current I flowing through $L_t$, one variation is to detect both $V_p$ and I. Furthermore, under the same principle, electrical parameters detected by such double channel amplitude demodulation are not limited to above examples. Double channel demodulation here generally refers to the amplitude demodulation of two variables (such as $V_p$ and I or $V_p$ and $V_{Lt}$).

Figure 5:
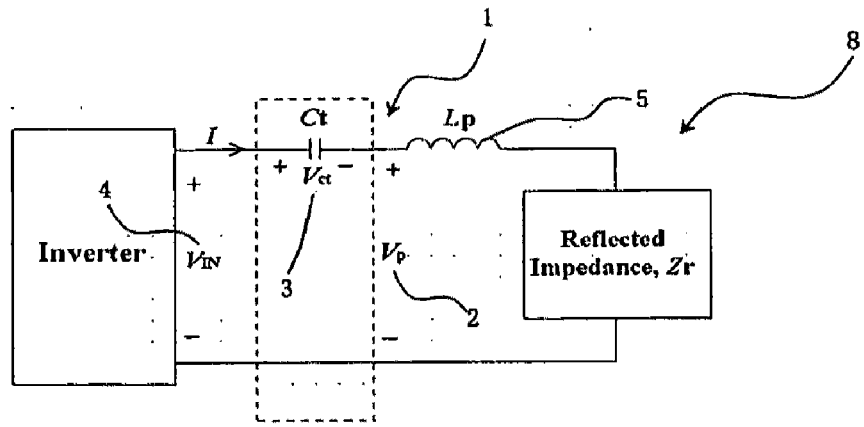
FIG. 5 is a circuit diagram of a demodulation circuit in accordance with another embodiment of the present invention, the demodulation circuit forming part of a wireless power transmitter.

The same principle can also be applied to other transmitter topologies. FIG. 5 shows another variation of the embodiment of the demodulation circuit 1 where it forms part of the transmitter 8. In this variation, the TX passive network is formed by one capacitor $C_t$ connected in series with the transmitter coil 5. The vector sum of the voltage $V_{ct}$ across the capacitor $C_t$ and the voltage $V_p$ across the transmitter coil 5 is equal to the voltage $V_{IN}$ across the demodulation circuit 1.

In this variation, the first electrical parameter 2 is the voltage $V_p$ across the transmitter coil 5 (the first power transfer coil), the second electrical parameter is the voltage $V_{ct}$ across the capacitor $C_t$, and the third electrical parameter is the voltage $V_{IN}$ across the demodulation circuit 1.

Figure 6:
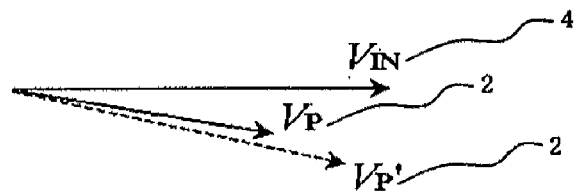
FIG. 6 is a vector diagram of electrical parameters of the demodulation circuit of FIG. 5, showing the results of amplitude modulation.
Figure 7:
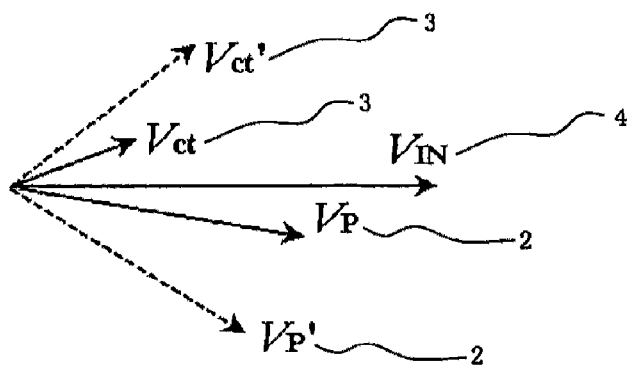
FIG. 7 is a vector diagram of electrical parameters of the demodulation circuit of FIG. 5, showing the results of phase modulation.

FIG. 6 shows a vector diagram when the amplitude of $V_p$ is changed due to load modulation, while FIG. 7 shows a vector diagram when the phase of $V_p$ is changed due to load modulation. For the latter case, the amplitude of $V_{ct}$ also needs to be sensed. Alternatively, both $V_p$ and I, being the current flowing through the capacitor $C_t$, are sensed for data demodulation.

Figure 8:
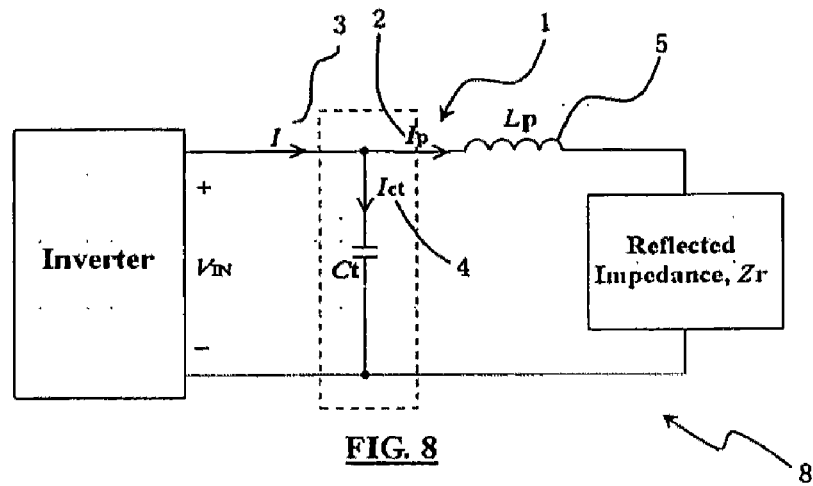
FIG. 8 is a circuit diagram of a demodulation circuit in accordance with a further embodiment of the present invention, the demodulation circuit forming part of a wireless power transmitter.

In another variation of the embodiment of the demodulation circuit 1 where it forms part of the transmitter 8, the TX passive network is formed by one capacitor $C_t$ connected in parallel with the transmitter coil 5, as shown in FIG. 8. It must be noted that in this case, $V_p$ is always equal to the constant input voltage $V_{IN}$ across the demodulation circuit. Therefore, it cannot be used for demodulation. Instead, the current $I_p$ flowing through the transmitter coil 5 is used. The vector sum of the current $I_{Ct}$ flowing through the capacitor $C_t$ and the current $I_p$ flowing through the transmitter coil 5 is equal to the current I entering the demodulation circuit 1.

Figure 9:
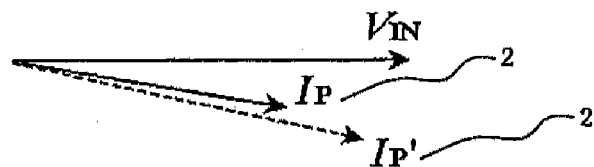
FIG. 9 is a vector diagram of electrical parameters of the demodulation circuit of FIG. 8, showing the results of amplitude modulation.
Figure 10:
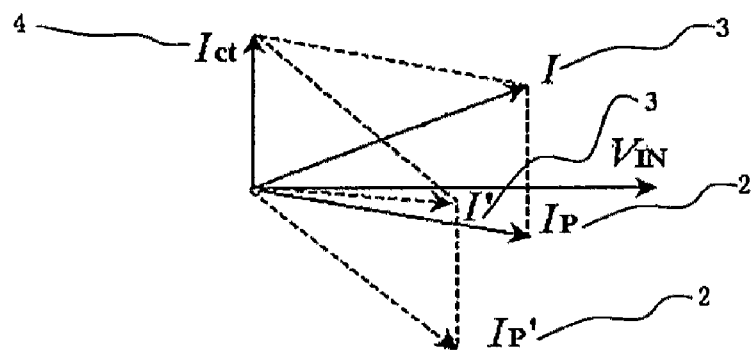
FIG. 10 is a vector diagram of electrical parameters of the demodulation circuit of FIG. 8, showing the results of phase modulation.

As seen from the vector diagrams in FIGS. 9 and 10, $I_p$ can have amplitude change (FIG. 9) or phase change (FIG. 10) due to load modulation. For the latter case (only phase change), the amplitude of the total current, I, (vector sum of $I_p$ and $I_{Ct}$) also needs to be detected. The key in this analysis is that $I_{Ct}$ is not changed with load modulation as $V_p$ ($V_{IN}$) is constant.

Thus, in this variation of the present embodiment, the first electrical parameter 2 is the current $I_p$ flowing through the transmitter coil 5 (the first power transfer coil), the second electrical parameter 3 is the current I entering the demodulation circuit 1, and the third electrical parameter 4 is the current $I_{Ct}$ flowing through the capacitor $C_t$.

The demodulation circuit 1 further includes a controller 12 for detecting the amplitudes of the first electrical parameter 2 and the second electrical parameter 3.

Figure 11:
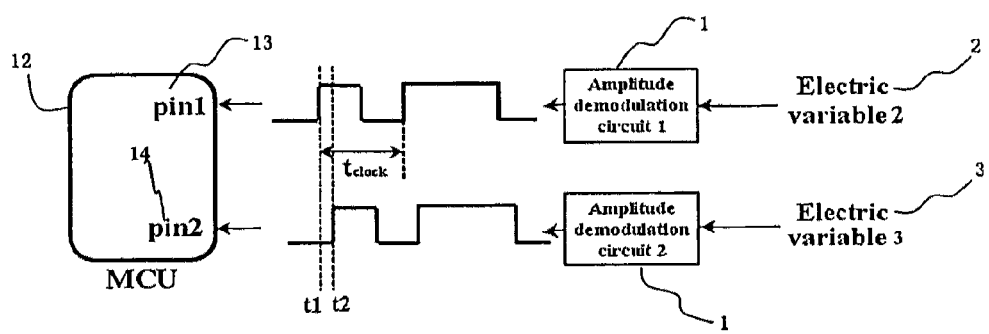
FIG. 11 is a diagram of a controller of a demodulation circuit in accordance with an embodiment of the present invention.

FIG. 11 shows one embodiment in which the controller 12 is a micro-controller-unit (MCU) with two interrupt, or other I/O, pins. Pin 13 of the MCU is triggered by an incoming signal. As shown in FIG. 11, at the time of t1, the first electrical parameter 2, from the demodulation circuit 1, triggers the pin 13. In an execution subprogram, the MCU 12 needs to calculate the time interval and/or determine the signal type and/or save data and/or check data and/or finish other tasks. During the execution of the subprogram, the pin 14 may be triggered by the second electrical parameter 3 at the time of t2. The MCU 12 can then choose at least, but not limited to, one of the following options:

1) pause the subprogram and respond to the second electrical parameter 3; and 2) stack the second electrical parameter 3 and finish the subprogram first.

Thus, in this embodiment, the controller 12 is adapted to directly detect both the amplitudes of the first and the second electrical parameters 2 and 3.

Figure 12:
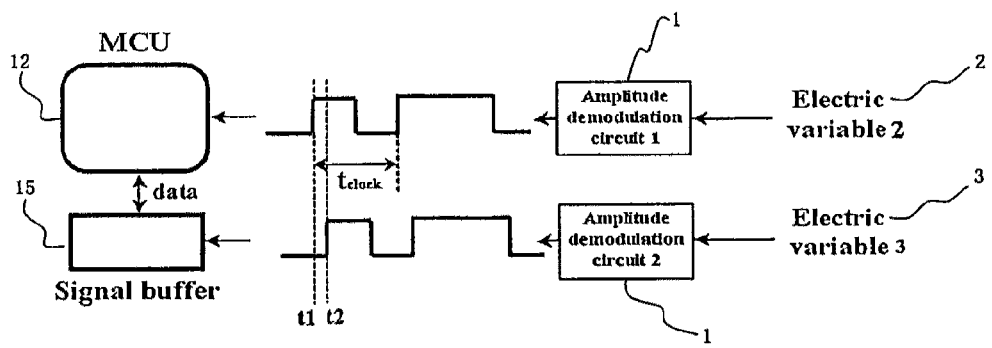
FIG. 12 is a diagram of a controller of a demodulation circuit in accordance with another embodiment of the present invention.

Another embodiment of the detection portion of the demodulation circuit 1 is shown in FIG. 12, in which one controller 12 and one signal buffer 15 are used. As above, the controller can be a MCU. The first electrical parameter 2 is inputted directly into the MCU which takes control of all the main functions, while the second electrical parameter 3 is inputted into the signal buffer 15 which only receives data and exchanges data with the MCU 12. Thus, the signal buffer 15 detects one of the amplitudes of the first and the second electrical parameters 2 and 3 and sends corresponding data to the MCU 12, whereas the MCU is adapted to directly detect the other of the amplitudes of the first and the second electrical parameters.

The signal buffer 15 can be implemented as a second MCU, a shift register, or other components with similar functions. If it is implemented by a second MCU, and since much less functionality is required, this second MCU 15 can be a low-level one with lower functionality, complexity and cost, compared to the first MCU 12, or master MCU. One advantage of this embodiment is that it can effectively avoid any risk of time interference, which can occur when two signals, such as both the first and second electrical parameters, are inputted into one MCU.

Figure 13:
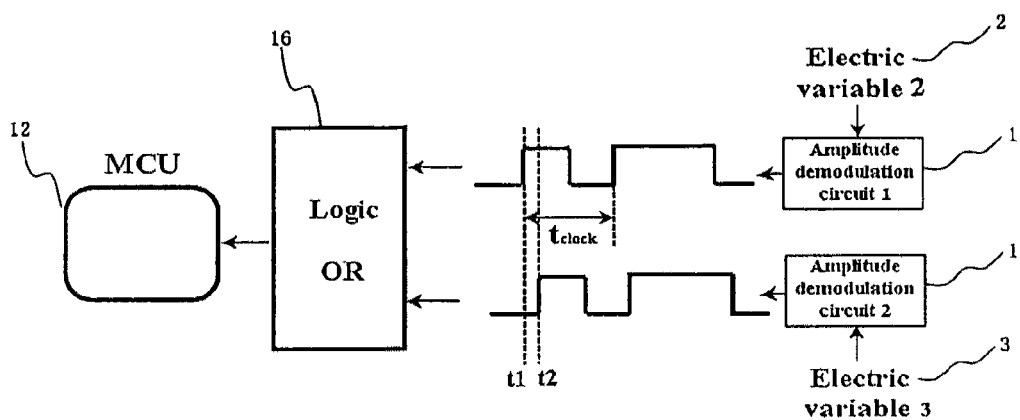
FIG. 13 is a diagram of a controller of a demodulation circuit in accordance with a further embodiment of the present invention.

A further embodiment of the detection portion of demodulation circuit 1 is shown in FIG. 13. Both the first 2 and the second 3 electrical parameters are inputted into a logic circuit 16 which implements an "or" function. The output of the logic circuit 16 can then be sent to the MCU 12. This embodiment requires the time difference between receiving the first and the second electrical parameters (t2−t1) to be as small as possible.

As described above, the reflected impedance $Z_r$, as shown in FIGS. 2, 5 and 8, is changed with load modulation of the modulation circuit 7. The change can be amplitude change and/or phase change. The reflected impedance is directly related to the impedance of the modulation circuit 7. Therefore, it is desirable to provide a modulation circuit that ensures sufficient modulation depth. In doing so, a compatible modulation circuit can be developed to work with a standardized demodulation circuit, that is to say, a modulation circuit having a load that is compatible with a standardized demodulation circuit.

Accordingly, and referring to the figures, the modulation circuit 7 is in accordance with an embodiment of another aspect of the present invention. The modulation circuit 7 has a communication modulator 17 to modulate the impedance of the modulation circuit thereby to communicate data, the communication modulator selected to modulate the impedance to a predetermined minimum modulation depth.

In the present embodiment, the modulation circuit 7 includes the second power transfer coil 6 and forms part of the wireless power receiver 9. Thus, and as noted above, the first power transfer coil 5 transmits power wirelessly to the second power transfer coil 6, and the second power transfer coil 6 is also known as the receiver coil. It will be appreciated, however, that in other embodiments, the modulation circuit 7 can form part of a wireless power transmitter, wherein the second power transfer coil 6 transmits power wirelessly to the first power transfer coil 5.

Figure 14:
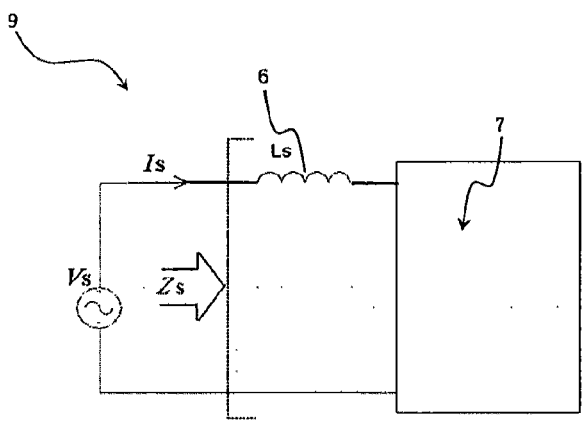
FIG. 14 is a block diagram of a wireless power receiver in accordance with an embodiment of the present invention, wherein the block includes a modulation circuit in accordance with an embodiment of the present invention.

Returning to the present embodiment, FIG. 14 shows a block diagram of the wireless power receiver 9. For simplicity, except for the receiver coil $L_s$, all the other receiver electronics (including the modulation circuit 7, communication modulators 17, rectification circuits, and a load) are hidden in the box. $V_s$ is the induced voltage across the modulation circuit 7 due to inductive coupling with the excited transmitter coil. If $V_s$ is regarded as constant, $I_s$ is changed during the communication process due to load modulation. The change can be amplitude change and/or phase change.

The impedance has an active part 18 and a reactive part 19, the vector sum of the active and reactive parts being equal to the impedance. The communication modulator 17 modulates one or both of the active and reactive parts to modulate one or both of the amplitude and phase of the impedance.

Figure 15:
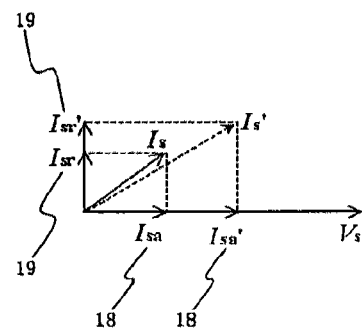
FIG. 15 is a vector diagram of electrical parameters of the modulation circuit of FIG. 14, showing the results of load modulation.

In the embodiment shown in FIG. 15, $I_s$ is divided into an active part $I_{sa}$, which is in phase with $V_s$, and a reactive part $I_{sr}$, which is in quadrature with $V_s$. It will be appreciated that the product of $V_s$ and $I_{sa}$ is mainly composed of the real power transfer to a load 20 in the modulation circuit 7.

Therefore, the minimum modulation depth can be expressed as:

$$\frac{\sqrt{(I'_{sa} - I_{sa})^2 + (I'_{sr} - I_{sr})^2}}{\sqrt{I_{sa}^2 + I_{sr}^2}} \geq req \quad (1)$$

where $I_{sa}'$ and $I_{st}'$ are the active and reactive parts, 18 and 19 respectively, of the total current flowing through the modulation circuit 7 after modulation of the impedance of the modulation circuit. req is a value representing the predetermined minimum modulation depth. The predetermined minimum modulation depth can be selected on the basis of any desired design requirements. It can also be incorporated into agreed industry standards.

Alternatively, if $I_s$ is looked as constant, the change of $V_s$ can also be used as a requirement of modulation depth, as expressed by (2):

$$\frac{\sqrt{(V'_{sa} - V_{sa})^2 + (V'_{sr} - V_{sr})^2}}{\sqrt{V_{sa}^2 + V_{sr}^2}} \geq req \quad (2)$$

In this case, $V_s$ is divided into an active part $V_{sa}$, which is in phase with $I_s$, and a reactive part $V_{st}$, which is in quadrature with $I_s$. Analogously to the above, $V_{sa}'$ and $V_{st}'$ are the active and reactive parts, 18 and 19 respectively, of the voltage across the modulation circuit 7 after modulation of the impedance of the modulation circuit, and req is a value representing the predetermined minimum modulation depth.

FIG. 18 shows one variation of the present embodiment in which the modulation circuit 7 is part of the receiver 9. In this variation, the communication modulator 17 includes the communication resistor 10 ($R_{cm}$) connected in parallel with the load 20. The communication resistor 10 is adapted to be switched on and off to modulate the impedance of the modulation circuit 7.

Figure 16:
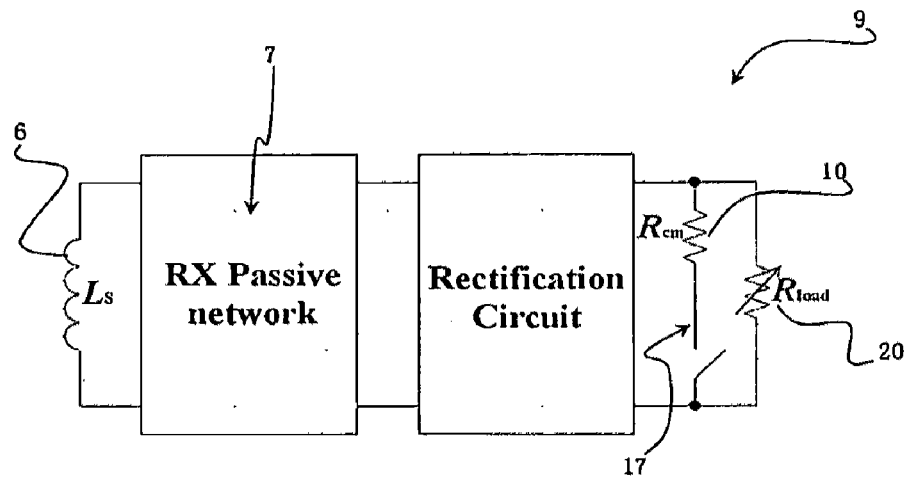
FIG. 16 is a circuit diagram of a modulation circuit in accordance with an embodiment of the present invention, the modulation circuit forming part of a wireless power receiver and using a communication resistor for load modulation.

In this variation, the modulation circuit 7 also includes an RX passive network, as indicated in FIG. 16, and is formed by a first capacitor $C_d$ and a second capacitor $C_s$. The first capacitor is connected in series after the second capacitor, and the communication resistor 10 is connected between the first and second capacitors and in parallel with the first capacitor. The second power transfer coil 6 (receiver coil) is connected in series before the second capacitor. A rectification circuit is also included, but is not shown in the FIG. 18 because $R_{load}$ and $R_{cm}$ can be reflected to be in front of the rectification circuit mathematically.

For straightforward analysis, it is assumed that $L_s$ and $C_s$ form a series resonant tank at the carrier frequency, which as noted above is equal to the power signal frequency. Under this assumption, $V_s$ is equal to $V_d$. As shown in FIG. 19, the vector diagram becomes very simple. From this vector diagram, it can be seen that $I_s$ can be divided into active part, $I_R$, and reactive part, $I_{cd}$. When the communication resistor 10 ($R_{cm}$) is switched on, $I_R$ becomes larger and increases to $I_R'$ so that the vector of $I_s$ is changed. Following the above principle, the value of $R_{cm}$ can be calculated.

For example, if the minimum value of $R_{load}$ is 5Ω (this is normally determined by the output voltage and maximum output power), to achieve a minimum modulation depth of 10%, the following expression can be used:

$$\frac{\sqrt{\left(\frac{V_d}{5\Omega // R_{cm}} - \frac{V_d}{5\Omega}\right)^2 + 0}}{\sqrt{\left(\frac{V_d}{5\Omega}\right)^2 + (2\pi f C_d V_d)^2}} \geq 10\% \quad (3)$$

Suppose that the carrier frequency f (equal to the power signal frequency) is 110 kHz, and $C_d$ has a capacity of 18 nF. Solving the above equation yields the conclusion that $R_{cm} \leq 50\Omega$. In other words, $R_{cm}$ must be lower than 50Ω to achieve the required minimum modulation depth. It will be further understood that when $R_{load}$ has any value higher than 5Ω (so that output power is lower than maximum power), the upper limit of $R_{cm}$ becomes larger than 50Ω. That is to say, a communication resistor 10 equal to or lower than 50Ω is the universal requirement to satisfy all loading conditions. Thus, this load dependent modulation (calculated on the basis of the minimum of the load resistor $R_{load}$) is independent of changing loading conditions. It must also be noted that the above analysis can also apply to a variation of the embodiment in which the modulation circuit 7 does not include a parallel first capacitor, $C_d$. In this case, as $I_{cd}$ is always equal to zero, the analysis will become simpler.

The same principle can also be applied to the variation of the present embodiment shown in FIG. 20 in which the communication modulator 17 includes the communication capacitor 11 ($C_d$). The communication capacitor 11 is connected in parallel with the load 20, and is adapted to be switched on and off to modulate the impedance of the modulation circuit 7. A second capacitor $C_s$ is connected in series before the communication capacitor 11 and the load 20, and the second power transfer coil 6 (receiver coil) is connected in series before the second capacitor $C_s$. The vector diagram of this variation is shown in FIG. 21.

In this variation, $I_{cd}$ is equal to zero without load modulation. The following expression applies:

$$\frac{\sqrt{0 + (2\pi f C_d V_d - 0)^2}}{\sqrt{\left(\frac{V_d}{5\Omega}\right)^2 + 0}} \geq 10\% \quad (4)$$

Suppose again that the carrier frequency f (equal to the power signal frequency) is 110 kHz. It can be solved that $C_d \geq 29$ nF. It will be further understood that when $R_{load}$ has any value higher than 5Ω (so that output power is lower than maximum power), the lower limit of $C_d$ becomes smaller than 29 nF. In other words, a communication capacitor 11 equal to or higher than 29 nF is a universal requirement to satisfy all loading conditions. Again, this load dependent modulation (calculated on the basis of the minimum of the load resistor $R_{load}$) is independent of changing loading conditions.

The two examples above both assume that $L_s$ and $C_s$ resonate at the carrier frequency, so that $V_s$ is equal to $V_d$. However, in many cases, such a resonant condition cannot be met. In some cases, $C_s$ is not included in the modulation circuit 7 at all. For example, in the variation shown in FIG. 22, $V_t$ is the voltage across $L_s$ and $C_s$, both of which do not resonate at the carrier frequency. In this case, equation (2) is more suitable for an analysis.

Figure 23:
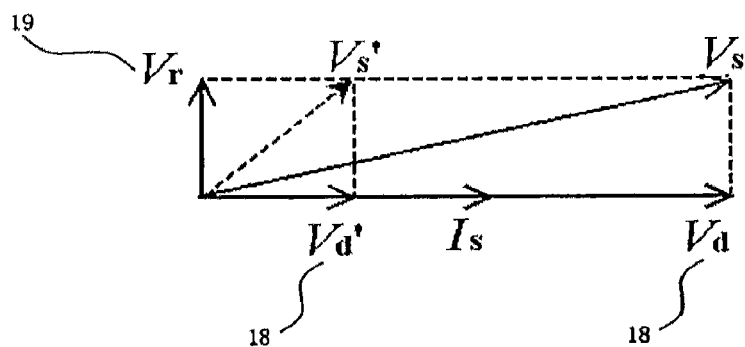
FIG. 23 is a vector diagram of electrical parameters of the modulation circuit of FIG. 22, showing the results of load modulation, and assuming that $L_s$ and $C_s$ do not resonate at the carrier frequency.

As seen from the vector diagram shown in FIG. 23, $V_s$ is composed of the active part 18, $V_d$, and the reactive part 19, $V_r$. When the communication resistor 10 is connected into the modulation circuit 7, the vector of $V_d$ is shortened to $V_d{}'$, and the vector of $V_s$ is changed to $V_s{}'$. The following expression (5) is derived from (2):

$$\frac{\sqrt{(I_s \cdot (R_{load} // R_{cm}) - I_s \cdot R_{load})^2 + 0}}{\sqrt{(I_s \cdot R_{load})^2 + \left(2\pi f L_s I_s - \frac{I_s}{2\pi f C_s}\right)^2}} \geq req \quad (5)$$

If, in the present variation, $R_{load\_min}=5\Omega$, $L_s=30.3$ µH, $C_s=+\infty$ (meaning that there is no resonant tank in the modulation circuit 7), f=110 kHz, and req=10%, then expression (5) can be solved to determine that $R_{cm}$ should be equal to or higher than 6.6Ω. This would be a general requirement for all loading conditions.

A further variation of the present embodiment, the communication modulator 17 includes both a communication resistor and a communication capacitor, such as the communication resistor 10 and the communication capacitor 11 as described in the variations above. This provides further options for modulating one or both of the amplitude and phase of the impedance of the modulation circuit 7 to communicate data.

The above principle can apply to any communication modulator 17 used in any load modulation technique, assuming the minimum modulation depth requirement can be met under all loading conditions. This solves the problems in ensuring a minimum modulation depth, allowing more freedom in designing modulation circuits. It will be appreciated that although expressions (1) and (2) give explicit examples of defining minimum modulation depth, any method using vector analysis to define the modulation depth is covered by the present invention. It will also be noted form the above that the modulation circuit 7 can be passive.

Demodulation and modulation circuits such as those described above can be used to transfer data from a wireless power receiver to a wireless power transmitter. Typical data to be transferred includes identification, output voltage, output current, output power and temperature.

Another example of transferred data is called "signal strength", which represents the strength of the power signal, which is in turn defined as the oscillating magnetic field enclosed by a transmitter coil and a receiver coil. This data assists a transmitter to determine the position of a receiver before power transfer starts (i.e. load position detection)

For example, if a transmitter consists of many windings, the windings can be excited one by one or one group by one group. The sensed signal strength on the receiver side needs to be transferred to the transmitter. The winding(s) with the highest signal strength can be selected to be excited for power transfer. This process is named "selection". As selection needs to be finished before the power transfer cycle, the signal strength is normally the first message to be sent when the receiver's MCU is powered up. If there is no data transfer from the transmitter to the receiver to inform it to send a specific message, the receiver needs to send the signal strength message every time it is powered up. It must be noted that the receiver's MCU is normally powered by the output of the rectification circuit or by the charging device itself.

Figure 24:
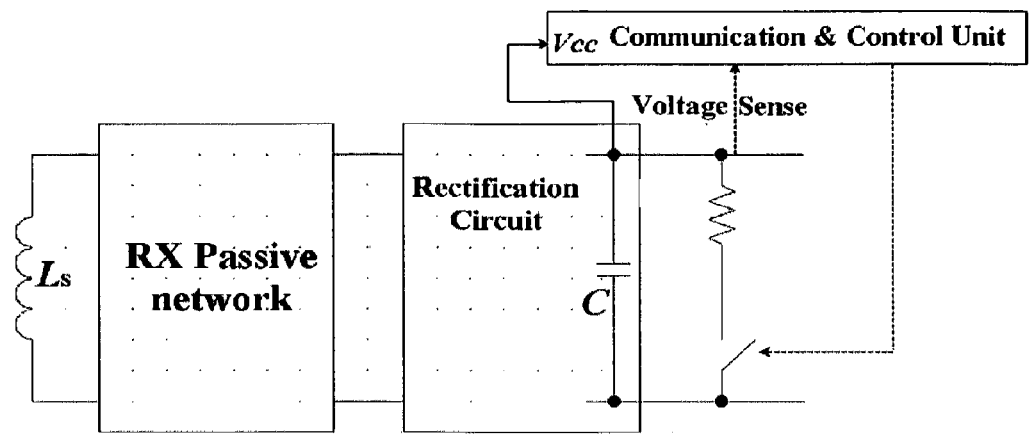
FIG. 24 is a circuit diagram of a prior art wireless power receiver, showing a rectification circuit and a voltage detector after the rectification circuit.

One prior way to detect the signal strength is by detecting the output voltage of the rectification circuit, as shown in FIG. 24, in which the load is not shown for simplicity and a capacitor at the rectifier output is highlighted. The detected voltage of the rectifier output is inputted into a Communication and Control Unit (normally a MCU) in the receiver. The MCU controls the communication switch of the communication modulator based on the encoded data. With the demodulation and modulation described earlier, for example, the data can be received and reconstructed by the transmitter.

One disadvantage of the abovementioned signal strength detecting method is that the capacitor at the output of the rectification circuit is normally very large in terms of capacitance (in order to reduce the output ripple). This results in a very slow decrease in voltage when the power signal is removed. During the selection process, the load is normally disconnected because it needs to wait for the transmitter configuration. Such a slow decrease in voltage is very disadvantageous to the selection process since it causes unnecessary delay for the next winding or winding group to be excited during the selection process. If the transmitter has many winding cells to be scanned, the total selection time becomes long and user-unfriendly.

Figure 17:
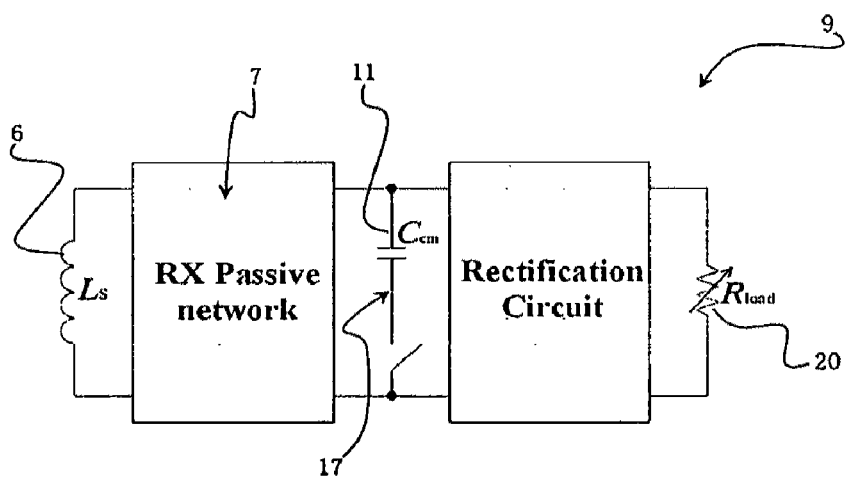
FIG. 17 is a circuit diagram of a modulation circuit in accordance with another embodiment of the present invention, the modulation circuit forming part of a wireless power receiver and using a communication capacitor for load modulation.
Figure 22:
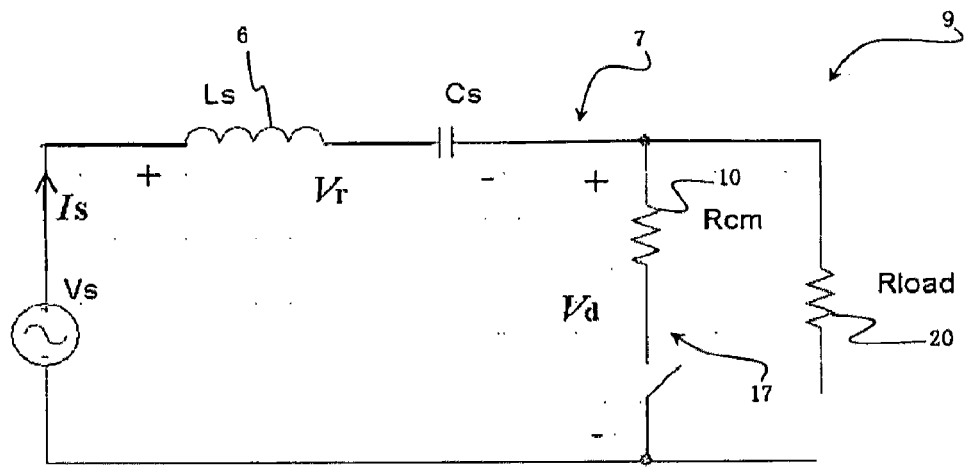
FIG. 22 is a circuit diagram of a modulation circuit in accordance with a further embodiment of the present invention, the modulation circuit forming part of a wireless power receiver and using a communication resistor for load modulation.

One straightforward solution to this problem is to normally close the communication switch during the selection process so that the large capacitor C, can be discharged quickly. However, this solution cannot work:

1) when the communication modulator is implemented with the use of a capacitor (as shown in FIG. 17) instead of resistor; and 2) when the receiver controller is powered by the charging device itself (e.g. the communication and control functions can be a part of the controller of the device itself to save cost).

Another better and universal solution disclosed in this invention is to detect the voltage in front of the rectification circuit. As there is no large energy storage component in front of the rectification circuit, such voltage can decrease very quickly when the power signal is removed. So this detected voltage can be used to trigger the MCU to reset. Furthermore, this method is independent of the power source of the MCU.

Figure 25:
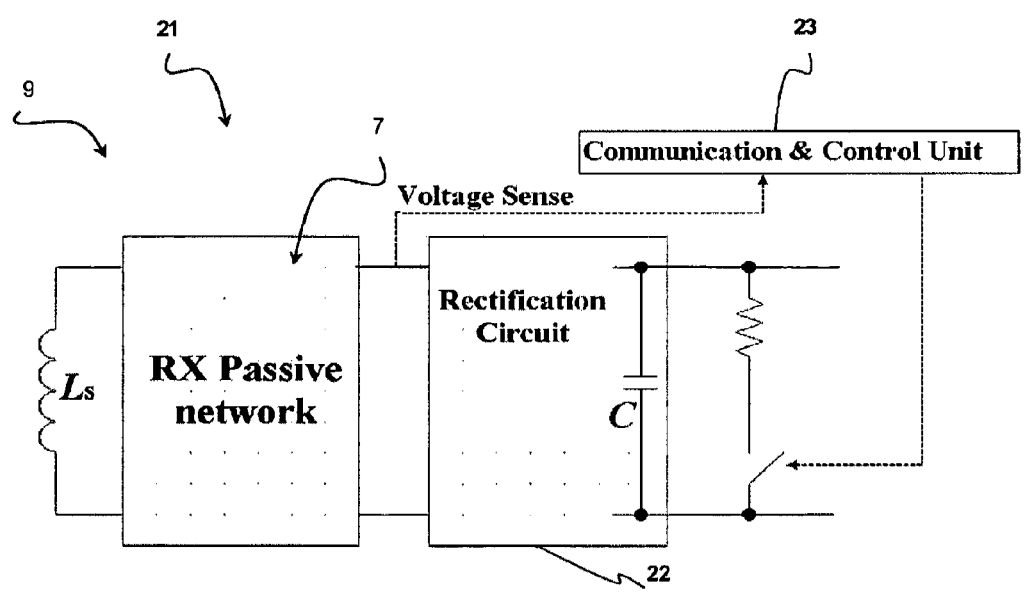
FIG. 25 is a circuit diagram of a wireless power receiver in accordance with an embodiment of the present invention, showing a rectification circuit and a voltage detector before the rectification circuit.

An embodiment of this aspect of the invention is shown in FIG. 25. In particular, there is provided a power receiver 21 for receiving and transferring power to a load. The power receiver 21 includes a rectification circuit 22 connected before the load, and further includes a voltage detector 23 for detecting the voltage before the rectification circuit.

There can be two extensions based on this method:

1) the voltage can also be sensed before the RX passive network; and 2) an auxiliary rectifier 24 can be used.

Figure 26:
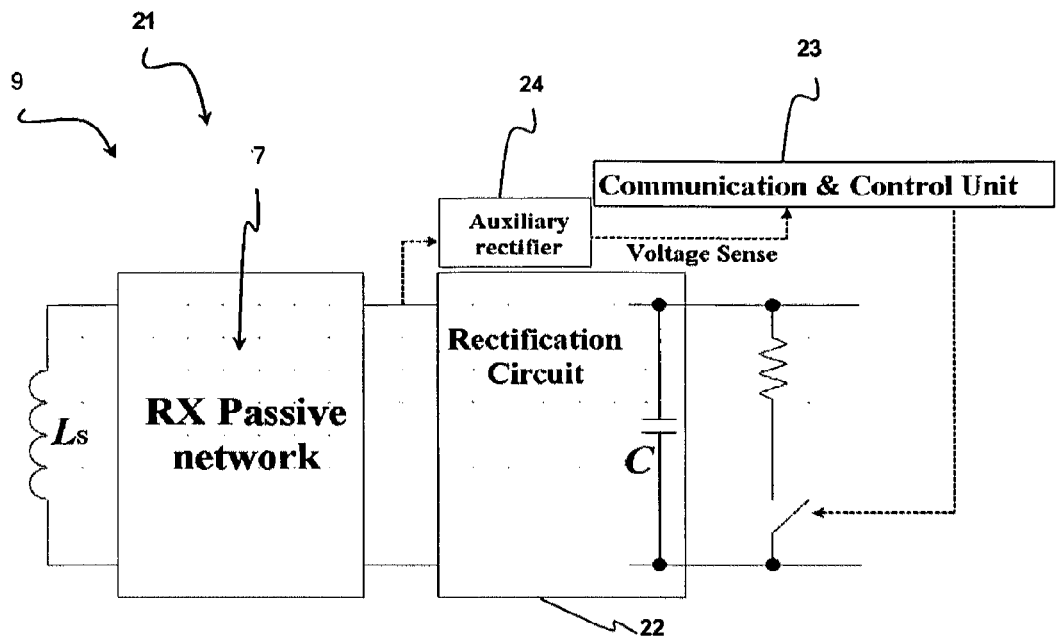
FIG. 26 is a circuit diagram of a wireless power receiver in accordance with another embodiment of the present invention, showing a rectification circuit, a voltage detector before the rectification circuit, and an auxiliary rectifier before the voltage detector.

As shown in FIG. 26, the auxiliary rectifier 24 is connected before the voltage detector 23.

Figure 27:
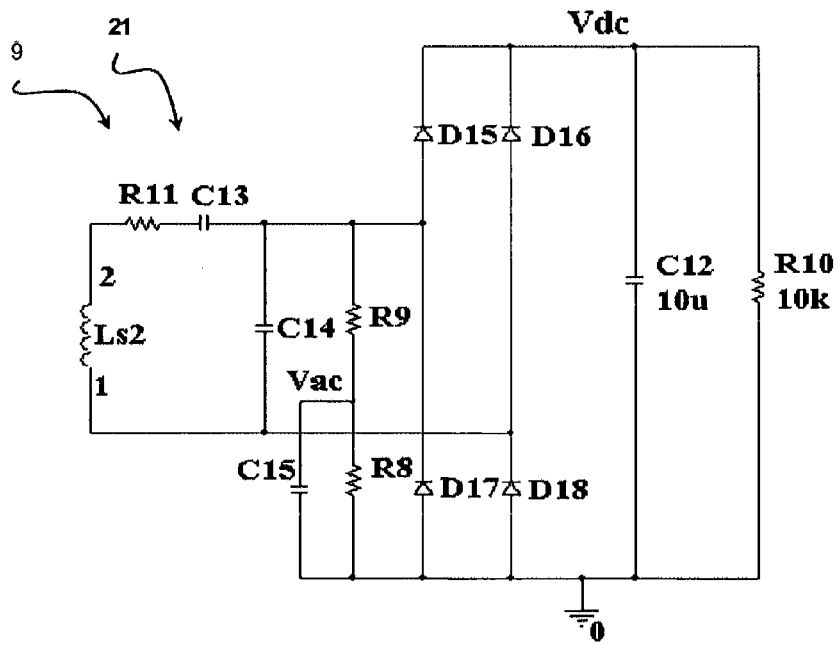
FIG. 27 is a circuit diagram of a wireless power receiver in accordance with a further embodiment of the present invention, showing a rectification circuit and voltage detection before the rectification circuit.

FIG. 27 shows one detailed embodiment of a circuit for the power receiver 21. C13 and C14 are very small resonant capacitors and form the RX passive network. C12 is the large capacitor at the output of the rectification circuit 22. R10 represents the MCU of the power receiver or some other component(s) that consume very low power. R8, R9 and C15 form the circuit network of the voltage detector 23 to detect the voltage in front of the rectification circuit 22. In one variation, it is a potential divider with a low pass filter.

Figure 28:
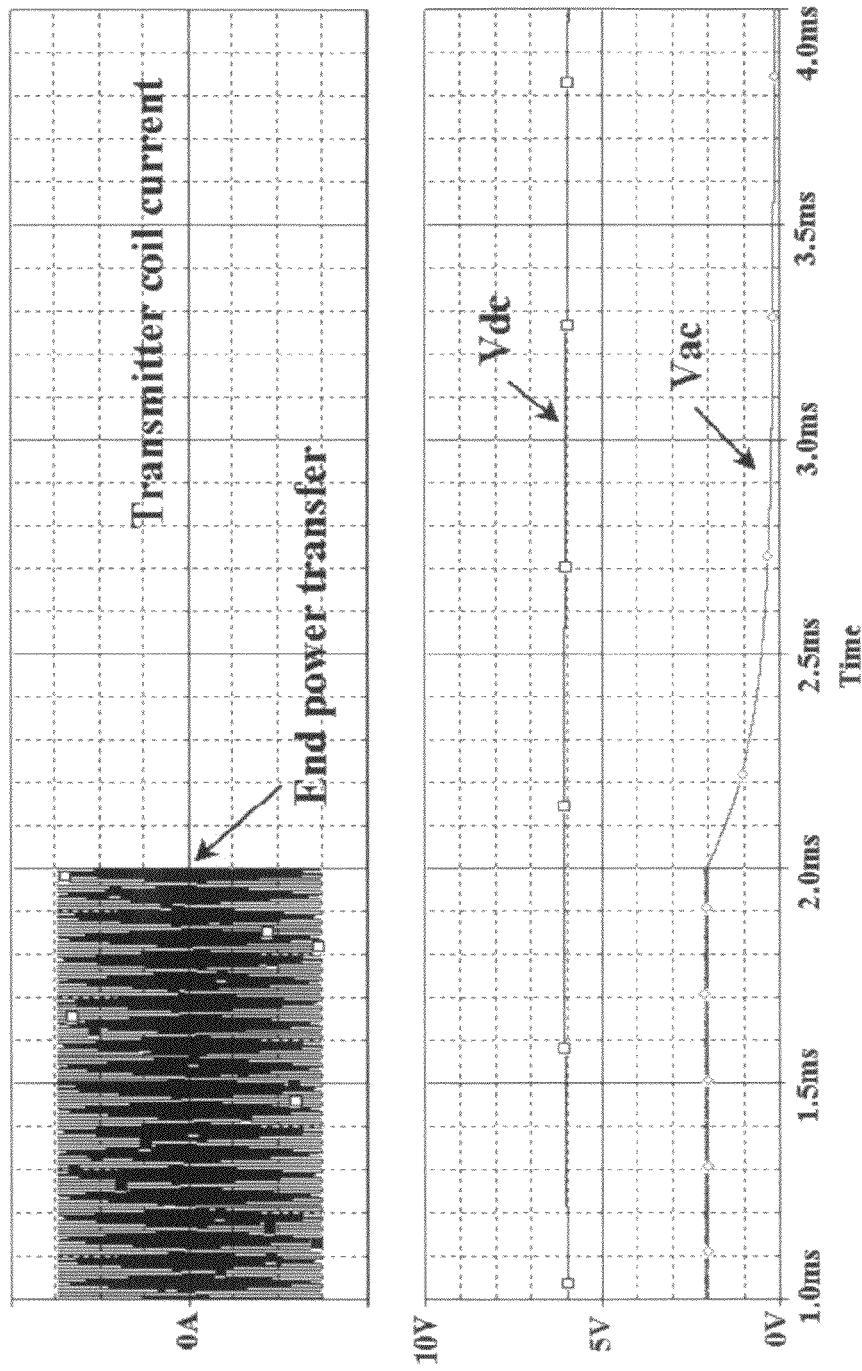
FIG. 28 is a graph of the performance of the circuit shown in FIG. 27.

FIG. 28 shows the performance of the circuit of FIG. 27. Power transfer ends at 2 ms. $V_{dc}$ (output voltage of rectification circuit 22, see FIG. 27) decreases very slowly due to the very light load. However, $V_{ac}$ (voltage in front of the rectification circuit 22) decreases to almost 0 in only 1 ms.

In this embodiment, after removing the power signal of one winding or winding group, the transmitter only needs to wait for at least 1 ms before it can excite the next winding or winding group.

In another embodiment, the power receiver 21 includes the modulation circuit 7 described above for communicating the detected voltage or "signal strength" data. In a further embodiment, the power receiver 21 is the wireless power receiver 9, and in particular, includes the second power transfer coil 6 for inductive coupling with the first power transfer coil 5 in the power transmitter 8, thereby allowing wireless power transmission from the power transmitter 8 to the power receiver 9. The detected voltage indicates power signal strength between the power transmitter 8 and the power receiver 9.

In another aspect of the invention, a power transfer system is provided. One embodiment of this aspect is a power transfer system including the demodulation circuit 1 and the modulation circuit 7, both as described above. In another embodiment, the system includes the wireless power transmitter 8 and the wireless power receiver 9. As described above, the wireless power transmitter 8 is adapted to transmit power wirelessly to the wireless power receiver 9. The wireless power receiver 9 includes the modulation circuit 7 and the wireless power transmitter 8 includes the demodulation circuit 1, thereby allowing data to be communicated wirelessly from the wireless power receiver to the wireless power transmitter. In a further embodiment, the wireless power receiver 9 is also in accordance with the power receiver 21 described above.

In a further aspect, the present invention also provides a method of modulating the impedance of a modulation circuit to communicate data. One embodiment includes determining the capacity of the communication modulator 17 such that the communication modulator can modulate the impedance to a predetermined minimum modulation depth, as described in detail above. The embodiment further includes providing the modulation circuit with the communication modulator 17, such that the impedance of the modulation circuit can be modulated with the communication modulator, thereby to communicate data. In another embodiment, the modulation circuit is the modulation circuit 7, with the method being carried out as described in detail above.

As shown in the foregoing, the present invention provides a demodulation technique, at least in the form of the demodulation circuit described, that can demodulate any impedance change, be it a change in amplitude, phase or any combination of both. Thus, a universal demodulation circuit and technique is provided by the invention. Furthermore, the demodulation circuit and technique provided does not require complex or costly components and can be implemented with only passive components.

Notwithstanding the universal nature of the demodulation provided, the present invention also provides a method and corresponding modulation circuit that ensures a minimum modulation depth. This provides a guideline for designing devices with modulation circuits that assist in guaranteeing maximum compatibility between modulating and demodulating devices.

The demodulation and modulation circuits and techniques provided by the invention are especially suited to power transfer devices, particularly wireless power transfer devices. The circuits and techniques of the invention for demodulation and load modulation are capable of handling the vast variety of loading conditions that occur in these types of power transfer applications. They are also capable of handling the other variables involved in these applications, such as differences in coupling due to the different possible relative positions of the transmitter and receiver and the different distances between them.

The present invention also provides a technique for improving the detection of signal strength in power receivers, especially wireless power receivers, as well as a power receiver embodying this technique. Detected signal strength is one of the types of data that is communicated between coupled power receivers and power transmitters, using demodulation and modulation circuits such as those also provided by the present invention and described in the examples above.

Furthermore, the present invention provides a power transfer system that includes the demodulation circuit and associated techniques, and the modulation circuit and associated techniques provided by the invention. In particular, the power transfer system can be a wireless power transfer system and can include the power receiver also provided by the invention. It will be appreciated that the system can provide all of the advantages discussed above exhibited by the various other aspects of the present invention.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. A demodulation circuit for a wireless power transfer device, the demodulation circuit having a first, a second, and a third electrical parameter wherein one of the electrical parameters is equal to the vector sum of the other two electrical parameters, and modulation of the impedance of the demodulation circuit results in corresponding modulation of one or both of the amplitude and phase of the first electrical parameter, the corresponding modulation being determinable by detecting the amplitude of the first electrical parameter and the amplitude of the second electrical parameter, thereby demodulating data communicated by modulation of the impedance of the demodulation circuit.

2. A demodulation circuit according to claim 1 wherein the demodulation circuit is passive.

3. A demodulation circuit according to claim 1 including a first power transfer coil for inductive coupling with a second power transfer coil in a modulation circuit, such that modulation of the impedance of the modulation circuit results in corresponding modulation of the impedance of the demodulation circuit, thereby allowing data to be communicated wirelessly from the modulation circuit to the demodulation circuit.

4. A demodulation circuit according to claim 3 including an inductor connected in series with the first power transfer coil and a capacitor connected after the inductor in parallel with the first power transfer coil, such that the vector sum of the voltage across the inductor and the voltage across the first power transfer coil is equal to the voltage across the demodulation circuit, and wherein the first electrical parameter is the voltage across the first power transfer coil, the second electrical parameter is the voltage across the inductor, and the third electrical parameter is the voltage across the demodulation circuit.

5. A demodulation circuit according to claim 4 wherein the amplitude of the voltage across the inductor is detected by detecting the amplitude of the current flowing through the inductor.

6. A demodulation circuit according to claim 3 including a capacitor connected in series with the first power transfer coil, such that the vector sum of the voltage across the capacitor and the voltage across the first power transfer coil is equal to the voltage across the demodulation circuit, and wherein the first electrical parameter is the voltage across the first power transfer coil, the second electrical parameter is the voltage across the capacitor, and the third electrical parameter is the voltage across the demodulation circuit.

7. A demodulation circuit according to claim 6 wherein the amplitude of the voltage across the capacitor is detected by detecting the amplitude of the current flowing through the capacitor.

8. A demodulation circuit according to claim 3 including a capacitor connected in parallel with the first power transfer coil, such that the vector sum of the current flowing through the capacitor and the current flowing through the first power transfer coil is equal to the current entering the demodulation circuit, and wherein the first electrical parameter is the current flowing through the first power transfer coil, the second electrical parameter is the current entering the demodulation circuit, and the third electrical parameter is the current flowing through the capacitor.

9. A demodulation circuit according to claim 3 forming part of a wireless power transmitter, wherein the first power transfer coil transmits power wirelessly to the second power transfer coil.

10. A demodulation circuit according to claim 1 including a controller for detecting the amplitudes of the first and the second electrical parameters.

11. A demodulation circuit according to claim 10 wherein the controller is adapted to directly detect both the amplitudes of the first and the second electrical parameters.

12. A demodulation circuit according to claim 10 including a signal buffer for detecting one of the amplitudes of the first and the second electrical parameters and sending corresponding data to the controller, wherein the controller is adapted to directly detect the other of the amplitudes of the first and the second electrical parameters.

13. A demodulation circuit according to claim 12 wherein the signal buffer is a shift register or a second controller.

14. A demodulation circuit according to claim 13 wherein the second controller is of lower functionality or complexity when compared to the first controller.

15. A demodulation circuit according to claim 10 including a logic network for detecting both the amplitudes of the first and the second electrical parameters and performing a logical "or" function on the amplitudes, wherein the controller is adapted to receive the results of the logical "or" function.

16. A demodulation circuit according to claim 10 wherein the controller is a micro-controller-unit.

17. A demodulation circuit according to claim 1 wherein the demodulation circuit performs one or more of the following functions: a resonant tank, impedance matching, and filtering.

* * * * *